(12) United States Patent
Bollay (10) Patent No.: US 7,565,308 B1
(45) Date of Patent: Jul. 21, 2009

(54) METHOD OF EXECUTING AN ELECTRONIC COMMERCE SALE FROM AN AFFILIATE WEB SITE

(76) Inventor: Denison W. Bollay, 203 Chapala St., Santa Barbara, CA (US) 93101

( * ) Notice: Subject to any disclaimer, the term of this patent is extended or adjusted under 35 U.S.C. 154(b) by 0 days.

(21) Appl. No.: 09/276,598

(22) Filed: Mar. 25, 1999

(51) Int. Cl.
G06Q 30/00 (2006.01)
(52) U.S. Cl. .......................................... 705/26; 705/27
(58) Field of Classification Search .................. 705/27, 705/26
See application file for complete search history.

(56) References Cited

U.S. PATENT DOCUMENTS

| | | | | |
|---|---|---|---|---|
| 5,319,542 A * | 6/1994 | King, Jr. et al. | ............. | 364/401 |
| 5,528,490 A * | 6/1996 | Hill | ............. | 364/403 |
| 5,687,322 A * | 11/1997 | Deaton et al. | ............. | 235/375 |
| 5,715,314 A * | 2/1998 | Payne et al. | ............. | 380/24 |
| 5,721,832 A * | 2/1998 | Westrope et al. | ............. | 395/227 |
| 5,724,424 A * | 3/1998 | Gifford | ............. | 380/24 |
| 5,727,048 A * | 3/1998 | Hiroshima et al. | ....... | 379/93.12 |
| 5,740,549 A * | 4/1998 | Reilly et al. | ............. | 705/14 |
| 5,825,881 A * | 10/1998 | Colvin, Sr. | ............. | 380/24 |
| 5,870,717 A * | 2/1999 | Wiecha | ............. | 705/26 |
| 5,884,045 A * | 3/1999 | Kurihara | ............. | 395/200.67 |
| 5,960,411 A * | 9/1999 | Hartman et al. | ............. | 705/26 |
| 6,014,644 A * | 1/2000 | Erickson | ............. | 705/37 |
| 6,016,504 A * | 1/2000 | Arnold et al. | ............. | 709/200 |
| 6,029,141 A * | 2/2000 | Bezos et al. | ............. | 705/27 |
| 6,032,130 A * | 2/2000 | Alloul et al. | ............. | 705/26 |
| 6,154,738 A * | 11/2000 | Call | ............. | 707/10 |
| 6,269,343 B1* | 7/2001 | Pallakoff | ............. | 705/26 |
| 6,360,216 B1* | 3/2002 | Hennessey et al. | ............. | 707/3 |
| 6,370,508 B2* | 4/2002 | Beck et al. | ............. | 705/7 |

(Continued)

OTHER PUBLICATIONS

Yignetter Corp. Prices Initial Public Offering. Newsbytes News Network, Feb. 1999.*

(Continued)

Primary Examiner—Jeffrey A. Smith
Assistant Examiner—Jason Dunham
(74) Attorney, Agent, or Firm—Maier & Maier, PLLC (57) ABSTRACT

A central hub server stands between a number of affiliate web sites and a number of vendor web sites to execute sales of vendor products featured on the affiliate web sites. Affiliate sites sign-up with the hub server and select products offered by vendors. The affiliate sites feature selected vendor products on their web sites. A buyer that browses an affiliate web site causes identifiers of the buyer, the affiliate site, and the product to be sent to the hub server. The hub server searches a database to find a picture of the product, its current price and the buyer's previously stored credit information and shipping address. The hub server returns a form to the user visiting the affiliate site, including a picture of the product, its price and a submit icon superimposed on the picture. If the buyer clicks on the submit icon, the purchase information is returned to the hub server. The buyer's credit card is debited with the purchase price and the vendor site is credited with the sale less commissions credited to the affiliate site and the hub. The form submitted to the vendor site includes all information necessary to make the purchase: product code, price, hub affiliate ID, and buyer shipping and billing information. The vendor site processes the sale and ships the product to the buyer's address.

14 Claims, 6 Drawing Sheets

U.S. PATENT DOCUMENTS 6,668,354 B1 * 12/2003 Chen et al. .................. 715/517

OTHER PUBLICATIONS

NBC has High Hopes for Traffic to Online Network Advertising Age. vol. 68, #19, p. 72, May 1997.*

Success on the Web Begins With a 'Thank You' and a Reward. Link-up. vol. 14, #5, p. 2, Sep. 1997.*

Keshav, S. an Engineering Approach to Computer Networking, p. 145, 1997.*

Castro, Elizabeth. HTML for the World Wide Web. p. 23, 37, 134, 135, 164, 182, 267, 1998.*

Warren Hersch, NECX: One-stop online, Aug. 31, 1998, Computer Reseller News, Iss. 805, p. 115, 2 pgs.*

* cited by examiner

FIGURE 5b

METHOD OF EXECUTING AN ELECTRONIC COMMERCE SALE FROM AN AFFILIATE WEB SITE

BACKGROUND OF THE INVENTION

1. Field of the Invention

This invention relates to Internet electronic commerce and more particularly, to a method by which a buyer can execute a sale from an affiliate web site with a vendor through a hub server without leaving the web site, or reentering the user's payment and shipping information

2. Description of the Prior Art

Internet electronic commerce allows businesses to conduct sales transactions over the Internet between customers (buyers) and vendors supplying goods and services. On-line software enables product displays and credit card ordering for users who sign onto a web site maintained by a vendor. Secure credit card transactions have made the purchase of goods and services safe and simple. Typically, a buyer browses a vendor's site and chooses items that are placed in an electronic shopping cart when the buyer clicks on an icon for a featured product. When all selections have been made, the buyer clicks on a "check-out" icon. A first time buyer is required to supply credit card information and a ship to address by filling out an on-line form. Clicking on a submit button submits the information in the form for processing. After a credit check is complete, the buyer is informed on-screen that the items will be shipped to the address supplied and the credit card will be debited for the total amount of the sale. The buyer's information is stored at the vendor's site, so that for subsequent visits to the same site, the buyer does not have to fill out a form again. However, if the buyer visits a different vendor's web site, the information will have to be supplied again, and again for each different vendor's web site visited.

If a user chooses Amazon.com's Book Store, the query form for Amazon.com is put on-screen. Alternatively, an advertising banner for Amazon.com's Book Store may be displayed at another web site, such as the WebData™ site (www.webdata.com). Once a user chooses a banner and clicks, the user leaves the WebData™ site for Amazon.com's Book Store web site.

Once at the Amazon.com's Book Store web site, book purchases can be made by the conventional on-line shopping cart method described above or by a special Amazon.com feature called 1-Click™. With 1-Click™, a buyer on the Internet can place an order by clicking just one button at the Amazon.com web site. Those buyers who have never placed an order at Amazon.com simply use an "Add it to your Shopping Cart" button to place the first order, proceed to the checkout and use the standard ordering process to complete the order. 1-Click ordering is turned on after this first order, provided the order is placed using a credit card.

After this first order, it isn't necessary for the user to fill out an order form again. The site automatically references the buyer's account information stored at the site for shipping and billing information. All domestic 1-Click™ orders made within a 90-minute period are consolidated by availability.

The buyer's 1-Click™ settings, which include shipping address, shipping method, and payment information, are created when the buyer first uses a credit card to make an order with Amazon.com. The buyer can change, activate, or turn off 1-Click™ settings.

While 1-Click™ ordering offers easy, streamlined buying for users at the amazon.com web site, there is no mechanism by which potential buyers can place an order from another web site without first being transferred to the amazon.com web site.

It is desirable to have a way to consummate a sale of products or services of many different vendors displayed on a web page without the user leaving the web site upon which the buyer found the product or service advertised. Furthermore, the buyer information should be remembered so that any user can purchase any vendor's product from any affiliate's web site.

SUMMARY OF THE INVENTION

Briefly, the invention is concerned with a method of processing multiple electronic transactions at a hub server. Three databases are stored at the hub, a vendor product information database, a buyer profile database, and an affiliate web Site database. The product information is referenced by a number of affiliate web Sites. Buyer credit card or payment method and shipping information of one or more buyers, including a particular buyer, is stored in the database during the first purchase from an affiliate web site. When a purchase request of the particular buyer is received from one of the affiliate web sites, the stored buyer credit and shipping information of the particular buyer is combined with product selection received from the affiliate site resulting in combined purchase order information. The combined purchase order information is recorded and forwarded to the vendor's web site or order entry system.

In accordance with an aspect of the invention, the hub server dynamically creates HTML code and/or JavaScript needed to submit a purchase request if the user clicks on an icon/button. This HTML and JavaScript is dynamically inserted into the page with an <IFRAME>, JavaScript, or similar tag.

The invention has the advantage that it enables a sale to be completed without the buyer leaving the affiliate's site.

The invention has the advantage that a buyer need enter credit card and ship to data only once and can visit any Site in the affiliate network later without having to reenter the data, even though new products from new vendors may be subsequently featured on any site.

BRIEF DESCRIPTION OF THE DRAWINGS

The invention will be described in greater detail with reference to the drawings in which.

DETAILED DESCRIPTION OF THE INVENTION

Figure 1:
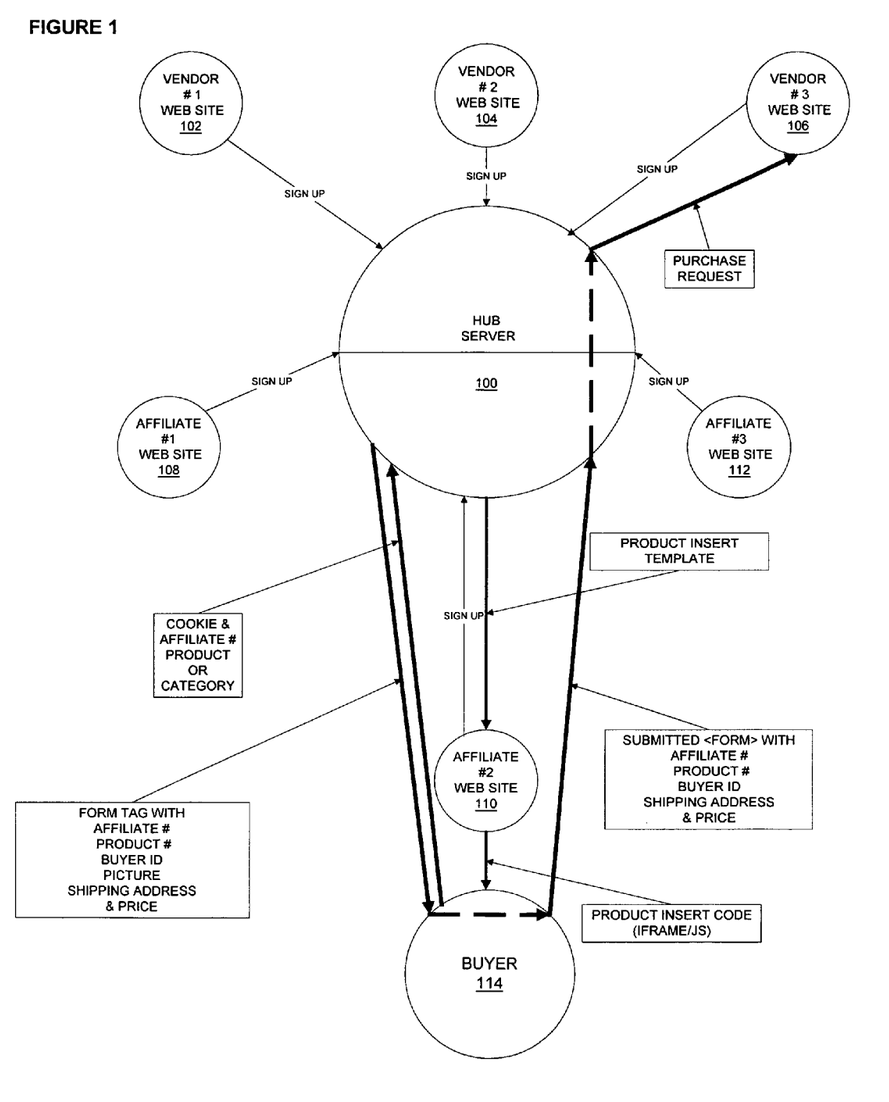
FIG. 1 is an overall block diagram of an Internet commerce system in which the present invention is embodied.

Refer to FIG. 1 which is an overall block diagram of an Internet commerce system in which the present invention is embodied. A central hub server 100 stands between a number of vendor web sites 102, 104, 106 and a number of affiliate web sites 108, 110, 112, to execute sales of vendor products featured on the affiliate web sites. A buyer 114 that browses an affiliate web site 110 and views a page containing product insert code causes identifiers of the buyer, the affiliate site, the product (or category), and optionally the vendor site to be sent to the hub server. The hub server searches a database to find a picture of the product, its current price and the buyer's previously stored credit and shipping address. The hub server returns an HTML <FORM> to the user, including a picture of the product, its price, affiliate ID, product ID, and buyer ID with a submit icon superimposed on the picture. The picture and submit icon are displayed on the affiliate's web page. If the buyer clicks on the submit icon, the purchase request form data is returned to the hub server. At the hub server, the orders are aggregated by vendor. Then the transactions are processed. The buyer's credit card is debited with the purchase price and the vendor site is credited with the sale less a commission which is credited to the affiliate site and the hub server. Alternatively, the buyer's information is forwarded to the vendor with the hub's (vendor affiliate) ID for commission/credit later. The form includes all information necessary to make the purchase: product code, price, affiliate site ID, vendor site ID and buyer ID. The purchase request is forwarded to the vendor which processes the sale and ships the product to the buyer's shipping address.

If the hub server searches the database and finds that the buyer's stored credit and shipping address have not been previously stored, the hub server returns a blank form to the buyer. The first time buyer is required to fill out the form which is submitted to the hub server. The hub server stores the buyer's credit and shipping address information for use with subsequent visits by this buyer to any of the affiliate web sites.

Vendor Sign-Up Software

Figure 2:
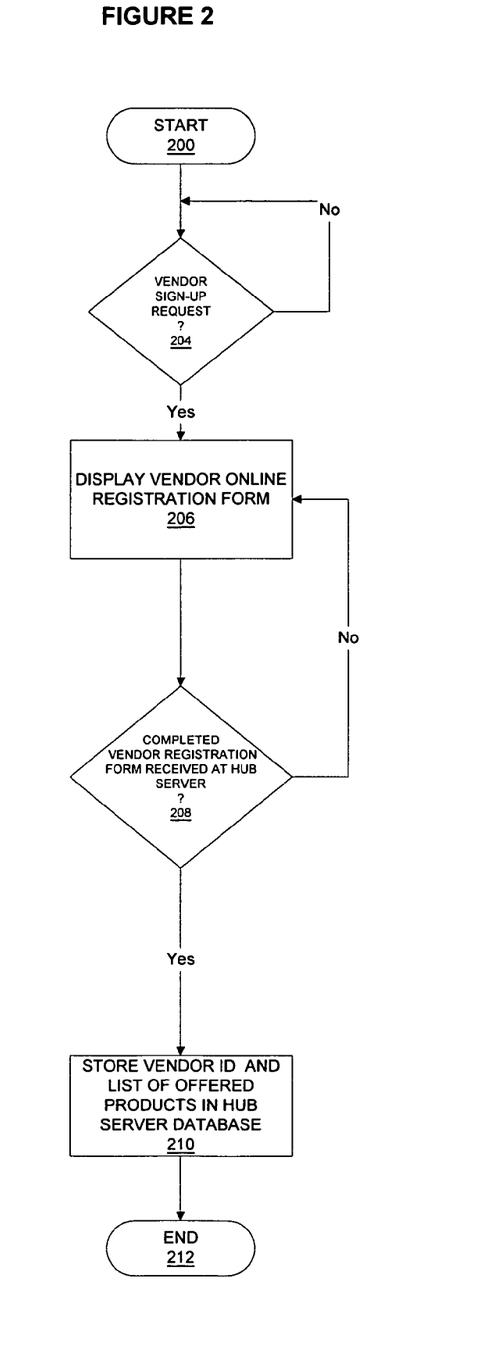
FIG. 2 is a flow diagram of computer software implementing vendor sign-up software.

Refer to FIG. 2 which is a flow diagram of computer software implementing vendor sign-up software. Vendors may sign up to sell products through affiliated network sites. Alternatively, orders can be forwarded to a vendor through its web interface even if the vendor is not explicitly signed up. In either case, buyer information and credit card number are forwarded to the vendor's site by the hub server with all orders. If a vendor's sign-up request received 204 at the hub server, an on-line registration form is displayed 206. The vendor completes the form which includes a list of vendor's products to be offered for sale, or a site where the products may be found. When the completed form is received at the hub server 208, the vendor ID and list of (or location of) products being offered are stored in the hub server database.

Affiliate Sign-Up Software

Figure 3:
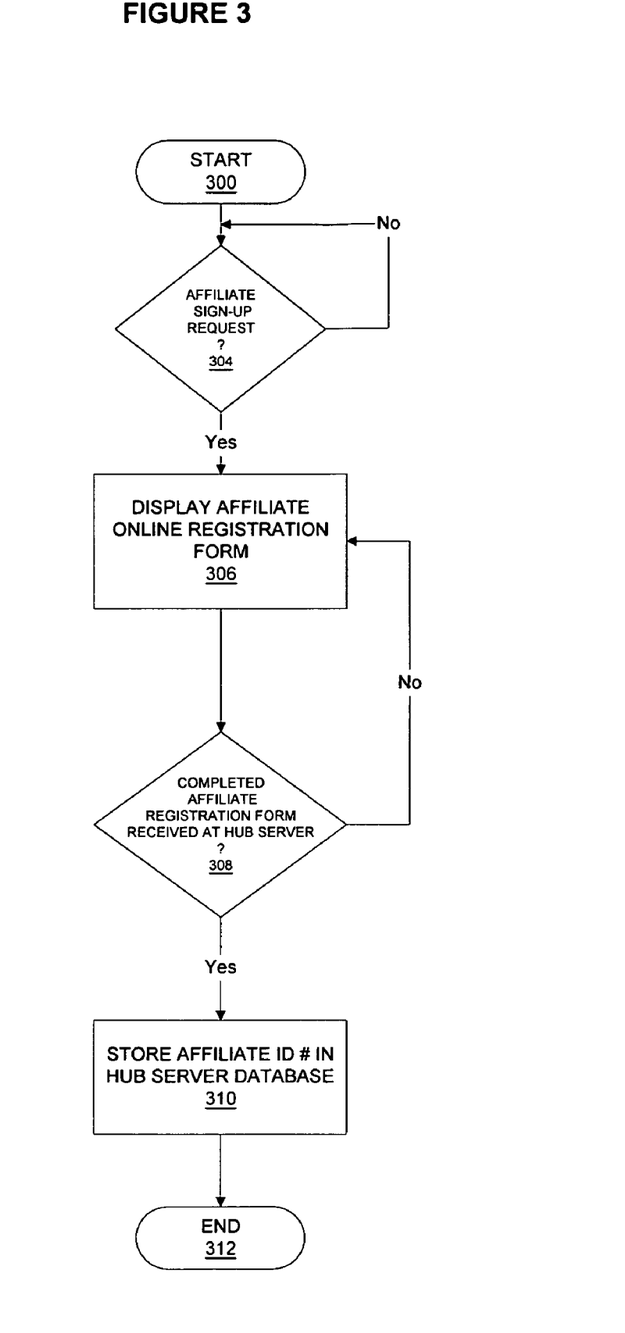
FIG. 3 is a flow diagram of computer software implementing affiliate sign-up software.

Refer to FIG. 3 which is a flow diagram of computer software implementing affiliate sign-up software. Affiliate sites may sign up to be part of the network by filling out an online form. If an affiliate's sign-up request is received 304 at the hub server via the hub server web page, an affiliate on-line registration form is displayed 306. The affiliate completes the form which includes the affiliate's ID. When the completed form is received at the hub server 308, the affiliate ID is stored in the hub server database.

Select Vendor Products Software

Figure 4:
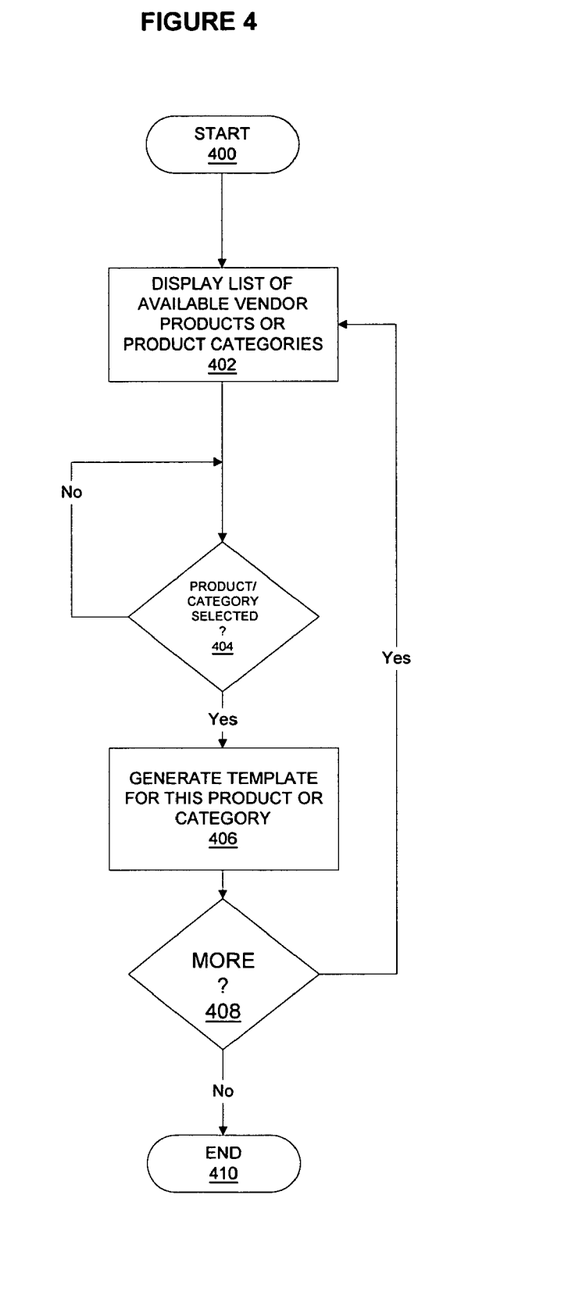
FIG. 4 is a flow diagram of computer software implementing select vendor products software; and, FIGS. 5a and 5b comprise a flow diagram of computer software implementing execute buyer's order software.

Refer to FIG. 4 which is a flow diagram of computer software implementing select vendor products software. A list of available vendor products obtained from the vendors during the vendor sign-up procedure is displayed 402. Alternatively, product categories may be displayed. Affiliate sites may select 404 any number of different vendor's products to sell, or product categories, suited to the nature of the affiliate's web site. A separate template is generated 406 automatically for each product or product category. This template is then pasted into an affiliate site's web page in accordance with the preference of the affiliate.

Display Product to Buyer Software

Figure 5A:
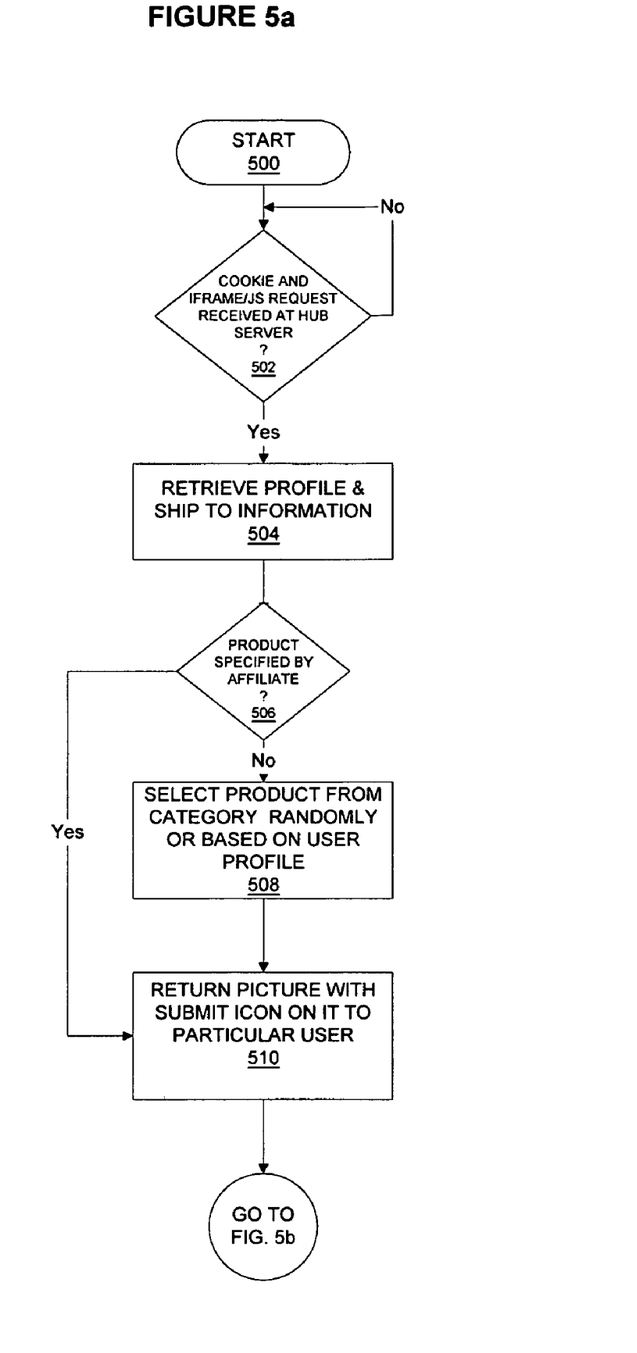

Refer to FIG. 5a which comprises a flow diagram of computer software implementing display product to buyer software. A prospective Buyer browses a web page on an affiliate site that has a product displayed with a submit icon on it. The product and submit icon are placed on the web page by an <IFRAME> or <JAVASCRIPT> tag (or similar tag).

A cookie received 502 at the hub server identifies a prospective buyer. Arguments in the IFRAME/JS sent to the hub server identify the affiliate site, product, and optionally the vendor site. A cookie is an identifier assigned to a buyer by the hub. If this is not a first time buyer, a buyer profile and shipping information is available and retrieved 504. If the product is specified by the affiliate 506 a picture of the product with a submit icon superimposed on it (or next to it) is returned to the user 510. If the product is not specified by the affiliate 506 a product is selected 508 from a product category randomly or based on the user profile retrieved previously.

As described above, a picture of the specified Product is returned to the user on the affiliate's page from the hub server (or pointed to by the hub) and is displayed with the "submit" icon on it. The ALT text associated with the "submit" icon describes the purchase, for example, "Buy 1 Electronic Day Trader for $21.50 from Amazon. Ship to John Smith." This is a <FORM> with all the necessary information required to make the purchase: product code, price, affiliate site, vendor (optional) and buyer. The "submit" image functions as a submit button.

Execute Buyer's Order Software

Figure 5B:
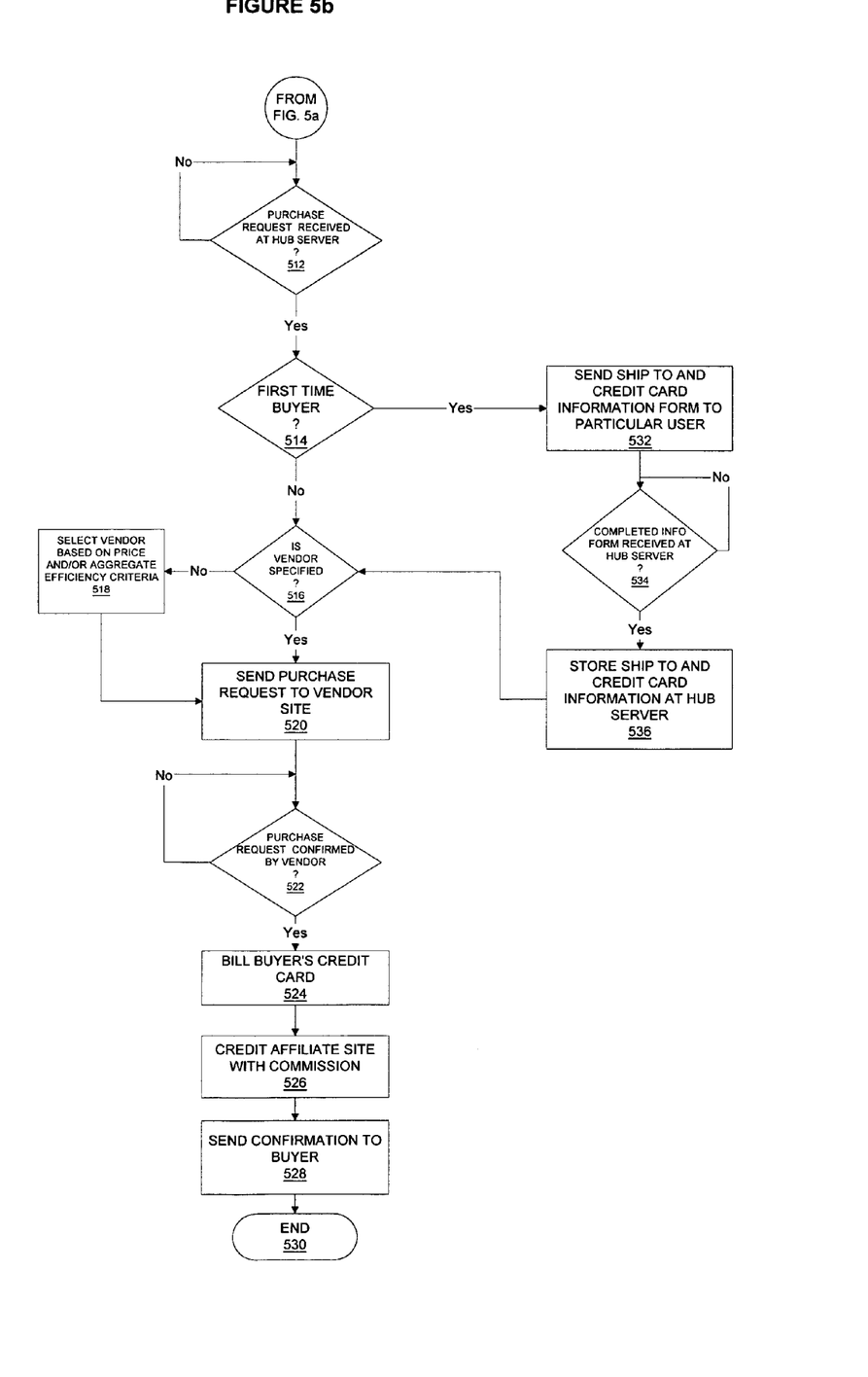

Refer to FIG. 5b which comprises a flow diagram of computer software implementing execute buyer's order software. If the user clicks on the "submit" button, a purchase request for the product is made. When the purchase request is received at the hub server 512, and a vendor is specified 516, the purchase request is sent to the vendor site 520 for shipment by the vendor to the buyer. If a vendor is not specified 516, a vendor is selected based on the best price and/or aggregate efficiency criteria such as shipping agent, geographical location, etc.

Once the purchase request is confirmed by the vendor 522, the hub server bills the buyer's credit card 524, credits the affiliate site with a commission 526 and confirmation from the vendor is returned to the buyer by email by the hub server 528 All purchase requests made within an hour (less any cancellations) are aggregated by the vendor and forwarded.

Buyer Information

Buyer data is stored at the hub server, so it can be utilized by buyers to make purchases from all affiliate sites in the affiliate network. The first time a buyer orders a product 514, a form is sent to the user to collect the buyer's shipping address, shipping method, and credit card payment information 532. Once the completed form is received at the hub server 534, the information collected is stored 536 at the hub server. The buyer's proprietary information need not be sent to the affiliate site as it is securely stored at the hub server.

It will be understood by those skilled in the art that the product displayed can be random within a category. Also, the product displayed can be custom based on the buyer's profile, site and category. Additionally a product (such as a book) may be featured, but the vendor selected before or after purchase based on price or aggregation efficiency. (e.g. If one of two books ordered is only available from a single vendor, it may be cheaper or more convenient to order both books from the same vendor to reduce shipping costs).

While the invention has been particularly shown and described with reference to preferred embodiments thereof, it will be understood by those skilled in the art that the foregoing and other changes in form and detail may be made therein without departing from the scope of the invention.

What is claimed is:

1. A method of processing multiple electronic transactions at a hub server comprising:

maintaining a vendor product information database of product information from multiple vendors at said hub server;

said product information being accessible by a plurality of affiliate web sites;

maintaining an affiliate web site database at said hub server;

maintaining a buyer profile database of buyer information of one or more buyers, including a particular buyer, at said hub server;

receiving a purchase request at said hub server, wherein said purchase request originated at one of said affiliate web sites and includes a buyer identifier, an affiliate web site identifier and at least one of a product identifier and a category identifier;

combining a plurality of information associated with said buyer identifier and stored within said buyer profile database with said purchase request received from one of said affiliate web sites to facilitate creating combined purchase order information;

forwarding said combined purchase order information from said hub server to one of said multiple vendors, such that said purchase request is completed while said buyer is on said affiliate web site;

receiving at said hub server from said affiliate web site a first time purchase request from said particular buyer;

sending from said hub server to said affiliate web site a buyer information form;

receiving at said hub server said buyer information form for said particular buyer; and storing said buyer information form for said particular buyer in said buyer profile database during a first purchase by said particular buyer at an affiliate web site, wherein said buyer information form includes a shipping address, shipping method and credit card payment information for said particular buyer.

2. The method of claim 1 wherein said step of forwarding said combined purchase order information from said hub server to a vendor comprises:

dynamically creating computer code needed to submit said purchase request upon a condition that said particular buyer selects a submit icon displayed on a web page;

inserting said computer code and a tag into said web page.

3. The method of claim 1 wherein said step of forwarding said combined purchase order information from said hub server to a vendor comprises:

dynamically creating computer code needed to submit said purchase request upon a condition that said particular buyer selects a submit icon displayed on a web page; and inserting said computer code and a tag into said web page.

4. The method of claim 1 wherein said step of forwarding said combined purchase order information from said hub server to a vendor further comprises selecting said vendor based on at least one of a price and an aggregation efficiency.

5. The method of claim 1 further comprises receiving said purchase request at said hub server, said purchase request includes a vendor identifier.

6. A method of processing multiple electronic transactions at a hub server comprising:

maintaining a vendor product information database of product information from multiple vendors at said hub server;

said product information being accessible by a plurality of affiliate web sites;

maintaining an affiliate web site database at said hub server;

maintaining a buyer profile database of buyer billing and shipping information of one or more buyers, including a particular buyer, at said hub server;

receiving a purchase request at said hub server, wherein said purchase request originated at one of said affiliate web sites and includes a buyer identifier, an affiliate web site identifier and at least one of a product identifier and a category identifier;

combining stored buyer billing and shipping information of said particular buyer with said purchase request received from one of said affiliate web sites to facilitate creating combined purchase order information;

recording said combined purchase order information at said hub server;

forwarding said combined purchase order information from said hub server to one of said multiple vendors;

receiving at said hub server from said affiliate web site a first time purchase request from said particular buyer;

sending from said hub server to said affiliate web site a buyer information form;

receiving at said hub server said buyer information form for said particular buyer; and;

storing said buyer information form for said particular buyer in said buyer profile database during a first purchase by said particular buyer at an affiliate web site, wherein the buyer information includes a shipping address, shipping method and credit card payment information for said particular buyer.

7. The method of claim 6 wherein said step of forwarding said combined purchase order information from said hub server to a vendor comprises:

dynamically creating computer code needed to submit said purchase request upon a condition that said particular buyer selects a submit icon displayed on a web page;

inserting said computer code and a tag into said web page.

8. The method of claim 6 wherein said step of forwarding said combined purchase order information from said hub server to a vendor comprises:

dynamically creating computer code needed to submit said purchase request upon a condition that said particular buyer selects a submit icon displayed on a web page; and inserting said computer code and a tag into said web page.

9. The method of claim 6 wherein said step of forwarding said combined purchase order information from said hub server to one of said multiple vendors further comprises selecting one of said multiple vendors based on at least one of a price and an aggregation efficiency.

10. The method of claim 6 further comprises receiving said purchase request at said hub server, said purchase request includes a vendor identifier.

11. A method of processing multiple electronic transactions at a hub server comprising:

accessing vendor product information from a vendor web site;

storing said vendor product information at said hub server;

transferring said vendor product information to a plurality of affiliate web sites;

receiving buyer billing and shipping information of one or more buyers, including a particular buyer, from said plurality of affiliate web sites;

storing said buyer billing and shipping information at said hub server;

receiving at said hub server from one of said affiliate web sites a purchase request of said particular buyer for a selected product;

combining said stored buyer billing and shipping information of said particular buyer with said selected product information received from said affiliate web site to facilitate creating combined purchase order information;

forwarding said combined purchase order information from said hub server to said vendor web site by selecting said vendor based on an aggregation efficiency.

12. The method of claim 11 wherein said step of transferring said vendor product information to a plurality of affiliate web sites further comprises selecting said product information randomly within a category.

13. The method of claim 11 wherein said step of transferring said product information to a particular user further comprises selecting said product based on one or more of a buyer's profile, affiliate site and category.

14. A method of executing purchase sales of vendor products featured on a plurality of affiliate web sites, wherein a central hub server is coupled in communication to the plurality of affiliate web sites and a plurality of vendor web sites, said method comprising:

associating a plurality of affiliate web sites with said hub server;

selecting, at a particular affiliate web site, products offered by vendors;

displaying selected products to users on said plurality of affiliate web sites;

sending a sale request that includes a buyer identifier, an affiliate web site identifier, a product identifier and a vendor web site identifier to said hub server in the event a buyer selects a vendor product displayed on said particular affiliate web site;

searching a database at said hub server for a product picture, a current product price and previously stored buyer credit card information and shipping address associated with said buyer identifier;

sending, from said hub server to said buyer at said particular affiliate web site, a form including said product picture, said current product price and a submit icon superimposed on said product picture;

returning said form, from said buyer at said particular affiliate web site to said hub server, in the event said buyer clicks on said submit icon;

debiting, at said hub server, said buyer's credit card with said purchase price;

crediting said vendor web site with an amount that is substantially equal to said current product price less a commission credited to said particular affiliate web site;

submitting from said hub server to said vendor web site information to facilitate transacting a purchase, wherein said information includes a product code, a product price, an affiliate web site identifier, a vendor web site identifier, a buyer identifier and shipping address;

processing said sale request at said vendor web site; and shipping said product to said shipping address in said form.

* * * * *